(12) United States Patent
Toko et al.

(10) Patent No.: US 10,696,323 B2
(45) Date of Patent: Jun. 30, 2020

(54) STEERING CONTROL DEVICE

(71) Applicants: JTEKT CORPORATION, Osaka-shi, Osaka (JP); TOYOTA JIDOSHA KABUSHIKI KAISHA, Toyota-shi, Aichi-ken (JP); DENSO CORPORATION, Kariya, Aichi-pref. (JP)

(72) Inventors: Takahiro Toko, Takahama (JP); Hiromasa Tamaki, Okazaki (JP); Jun Hasegawa, Okazaki (JP); Shohei Fujita, Okazaki (JP); Kohei Yanai, Toyota (JP); Tatsuya Suzuki, Nisshin (JP); Tatsuya Miyake, Kariya (JP); Takashi Suzuki, Kariya (JP)

(73) Assignees: JTEKT CORPORATION, Osaka-shi (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 15/674,674

(22) Filed: Aug. 11, 2017

(65) Prior Publication Data

US 2018/0057047 A1 Mar. 1, 2018

(30) Foreign Application Priority Data

Aug. 26, 2016 (JP) ................................ 2016-165885

(51) Int. Cl.
*B62D 5/04* (2006.01)
*B62D 6/00* (2006.01)
(Continued)

(52) U.S. Cl.
CPC ............ *B62D 6/008* (2013.01); *B62D 5/006* (2013.01); *B62D 5/0463* (2013.01); *B62D 5/0469* (2013.01); *G01L 5/221* (2013.01); *G01P 1/026* (2013.01); *H02P 21/18* (2016.02); *H02P 21/22* (2016.02); *B62D 3/12* (2013.01); *H02P 21/0003* (2013.01); *H02P 27/06* (2013.01)

(58) Field of Classification Search
None
See application file for complete search history.

(56) References Cited

U.S. PATENT DOCUMENTS

| 2008/0199160 A1 | 8/2008 | Yamazaki |
| 2008/0201041 A1* | 8/2008 | Jiang .................... B62D 5/046 701/42 |
| 2018/0111642 A1* | 4/2018 | Endo .................... B62D 5/0463 |

FOREIGN PATENT DOCUMENTS

| CN | 101326093 A | 12/2008 |
| EP | 1955926 A2 | 8/2008 |

(Continued)

OTHER PUBLICATIONS

Machine translation of JP2010100091, provided by https://worldwide.espacenet.com/ generated on Oct. 4, 2018. (Year: 2010).*

(Continued)

*Primary Examiner* — Adam D Tissot
*Assistant Examiner* — Laura E Linhardt
(74) *Attorney, Agent, or Firm* — Oliff PLC (57) ABSTRACT

A steering control device includes a command value setting processing portion configured to set a current command value based on a detection value of steering torque; a feedback processing portion configured to control a voltage applied to a motor so as to control a current flowing through the motor to the current command value, based on an output value of an integral element obtained by using a difference between the current and the current command value; an end determination processing portion configured to determine whether a turning angle of steered wheels has reached a limit angle; and an end-time limit processing portion configured to perform correction to increase a magnitude of the difference, based on a degree of a decrease in a magnitude of a rotational speed of the motor when the end determination processing portion determines that the turning angle has reached the limit angle.

3 Claims, 5 Drawing Sheets

(51) Int. Cl.
G05B 6/02 (2006.01)
H02P 21/00 (2016.01)
H02P 21/18 (2016.01)
H02P 21/22 (2016.01)
B62D 5/00 (2006.01)
G01L 5/22 (2006.01)
G01P 1/02 (2006.01)
*B62D 3/12* (2006.01)
*H02P 27/06* (2006.01)

(56) References Cited

FOREIGN PATENT DOCUMENTS

| | | | |
|---|---|---|---|
| JP | 2005-088666 A | | 4/2005 |
| JP | 2009-143312 A | | 7/2009 |
| JP | 2010100091 A | * | 5/2010 |
| JP | 2010100091 | * | 12/2010 |
| WO | 2007/093875 A2 | | 8/2007 |

OTHER PUBLICATIONS

Machine translation of JP2009143312, provided by https://worldwide.espacenet.com/ generated on Oct. 4, 2018. (Year: 2009).*

Figure 3 person translation of JP2010100091, provided by STIC generated on Oct. 15, 2018. (Year: 2010).*

Oct. 25, 2019 Office Action issued in Chinese Patent Application No. 201710696006.0.

Sep. 6, 2018 Search Report issued in European Patent Application No. 17186432.5.

\* cited by examiner

STEERING CONTROL DEVICE

INCORPORATION BY REFERENCE

The disclosure of Japanese Patent Application No. 2016-165885 filed on Aug. 26, 2016 including the specification, drawings and abstract is incorporated herein by reference in its entirety.

BACKGROUND

1. Technical Field

The disclosure relates to a steering control device configured to control a steering system, the steering system including a turning actuator that turns steered wheels of a vehicle, and the steering system assisting turning of the steered wheels in accordance with steering of a steering wheel.

2. Description of Related Art

For example, in Japanese Patent Application Publication No. 2009-143312 (JP 2009-143312 A), a steering control device is described. The steering control device executes control that reduces an impact that is generated at a time when a steering angle of a steering wheel reaches a specified amount, which leads to so-called end abutment, and thus, a turning angle of steered wheels reaches a limit angle. The control device determines that the end abutment has occurred when an absolute value of steering torque is equal to or larger than a threshold and an absolute value of a changing rate of the steering torque is equal to or larger than a threshold. When the control device determines that the end abutment has occurred, the control device obtains a current immediately before occurrence of the end abutment as a present assist current by using a phase delay of a low pass filter (paragraph [0022]). Then, the control device controls a motor such that a value of a current flowing through the motor coincides with a value obtained by sequentially subtracting a current value of a surplus current waveform, which is stored in advance, from the present assist current. This suppresses an increase in the current flowing through the motor, which occurs when a rotational speed of the motor is abruptly decreased due to the end abutment and an induced voltage is thereby decreased. In addition, the value of the current flowing through the motor is controlled to a value that is appropriate for maintaining the above turning angle at the limit angle (paragraph [0041]).

As described in Japanese Patent Application Publication No. 2005-88666 (JP 2005-88666 A), feedback control using an integral element is generally employed, as control of a current flowing through a motor in a steering control device.

SUMMARY

A decrease rate at which the induced voltage of the motor is decreased at a time when the end abutment occurs depends on a changing rate of the turning angle at the time when the end abutment occurs. Accordingly, in the case where the current value of the surplus current waveform, which is stored in advance, is sequentially subtracted as in the above control device, the current flowing through the motor may be excessively decreased or may be excessively increased depending on the changing rate of the turning angle at the time when the end abutment occurs. When the current flowing through the motor is excessively decreased, actual torque of the motor becomes insufficient as compared to an appropriate magnitude of the torque for maintaining the turning angle at the limit angle. As a result, the steering wheel is returned in a reverse direction, and thus, a user may feel a sense of discomfort. When the current flowing through the motor is excessively larger than the appropriate current, the torque of the motor is excessively increased, and thus, a load is applied to a steering system.

The disclosure provides a steering control device that suppresses occurrence of a situation where end abutment causes a value of a current flowing through a motor to excessively deviate from a value of the current immediately before the end abutment.

An aspect of the disclosure relates to a steering control device configured to control a steering system including a turning actuator that turns steered wheels of a vehicle. The steering system assists turning of the steered wheels in accordance with steering of a steering wheel. The turning actuator includes a motor. The steering control device includes a command value setting processing portion configured to set a current command value based on a detection value of steering torque; a feedback processing portion configured to control a voltage applied to the motor so as to control through feedback a current flowing through the motor to the current command value, based on an output value of an integral element obtained by using, as an input, a difference between the current flowing through the motor and the current command value; an end determination processing portion configured to determine whether a turning angle of the steered wheels has reached a limit angle determined by a structure of the steering system; and an end-time limit processing portion configured to perform correction to increase a magnitude of the difference between the current flowing through the motor and the current command value, based on a degree of a decrease in a magnitude of a rotational speed of the motor, when the end determination processing portion determines that the turning angle has reached the limit angle, the difference between the current flowing through the motor and the current command value being input to the feedback processing portion.

In the above configuration, before the turning angle reaches the limit angle, the output value of the integral element tends to be an appropriate value for a magnitude of an induced voltage before the turning angle reaches the limit angle such that the current flowing through the motor is controlled to the current command value. Then, when the turning angle reaches the limit angle, the magnitude of the induced voltage is decreased. As a result, the output value of the integral element tends to become excessively larger than an appropriate value for controlling the current flowing through the motor to the current command value. However, after the turning angle reaches the limit angle, the feedback processing portion decreases a magnitude of the voltage applied to the motor on the basis of a fact that a magnitude of a detection value of the current exceeds a magnitude of the current command value. Accordingly, the operation to decrease the magnitude of the voltage tends to be delayed with respect to the decrease in the magnitude of the induced voltage. In this regard, in the above configuration, the correction is performed to increase the magnitude of the above-described difference input to the feedback processing portion, in accordance with the degree of the decrease in the magnitude of the rotational speed of the motor. Thus, the voltage applied to the motor is sharply decreased because the magnitude of the detection value significantly exceeds the magnitude of the current command value. Thus, it is possible to suppress occurrence of a situation where the magnitude of the detection value significantly exceeds the magnitude of the current command value set by the command value setting processing portion. Further, an increase correction amount, by which the magnitude of the above-described difference is corrected to be increased, is set in accordance with the degree of the decrease in the magnitude of the rotational speed. Thus, the magnitude of the applied voltage can be more sharply decreased as the degree of the decrease in the magnitude of the induced voltage is increased. Therefore, it is possible to suppress occurrence of a situation where the end abutment causes the value of the current flowing through the motor to excessively deviate from the value of the current immediately before the end abutment.

In the steering control device according to the above-described aspect, the end-time limit processing portion may be configured to perform correction to increase the magnitude of the difference between the current flowing through the motor and the current command value by limiting a magnitude of the current command value constituting the difference to a value obtained by performing correction to decrease the current command value set by the command value setting processing portion based on the degree of the decrease in the magnitude of the rotational speed of the motor, when the end determination processing portion determines that the turning angle has reached the limit angle.

In the above-described configuration, the correction is performed to decrease the current command value based on the degree of the decrease in the magnitude of the rotational speed of the motor. Thus, the magnitude of the above-described difference can be corrected to be increased in accordance with the degree of the decrease in the magnitude of the rotational speed.

In the steering control device according to the above-described aspect, the end-time limit processing portion may be configured to i) limit the magnitude of the current command value for the motor that is input to the feedback processing portion, to a value obtained by adding, to the current command value set by the command value setting processing portion, a value obtained by multiplying a changing rate of the magnitude of the rotational speed of the motor by a coefficient, ii) maintain the coefficient at a specified value larger than zero for a specified time, and iii) gradually decrease the coefficient after the specified time elapses.

In the above-described configuration, a decrease correction amount, by which the current command value is corrected to be decreased based on the degree of the decrease in the rotational speed, is gradually decreased by decreasing the coefficient after the specified time elapses. Accordingly, the current command value, which is set by the command value setting processing portion, can be smoothly changed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
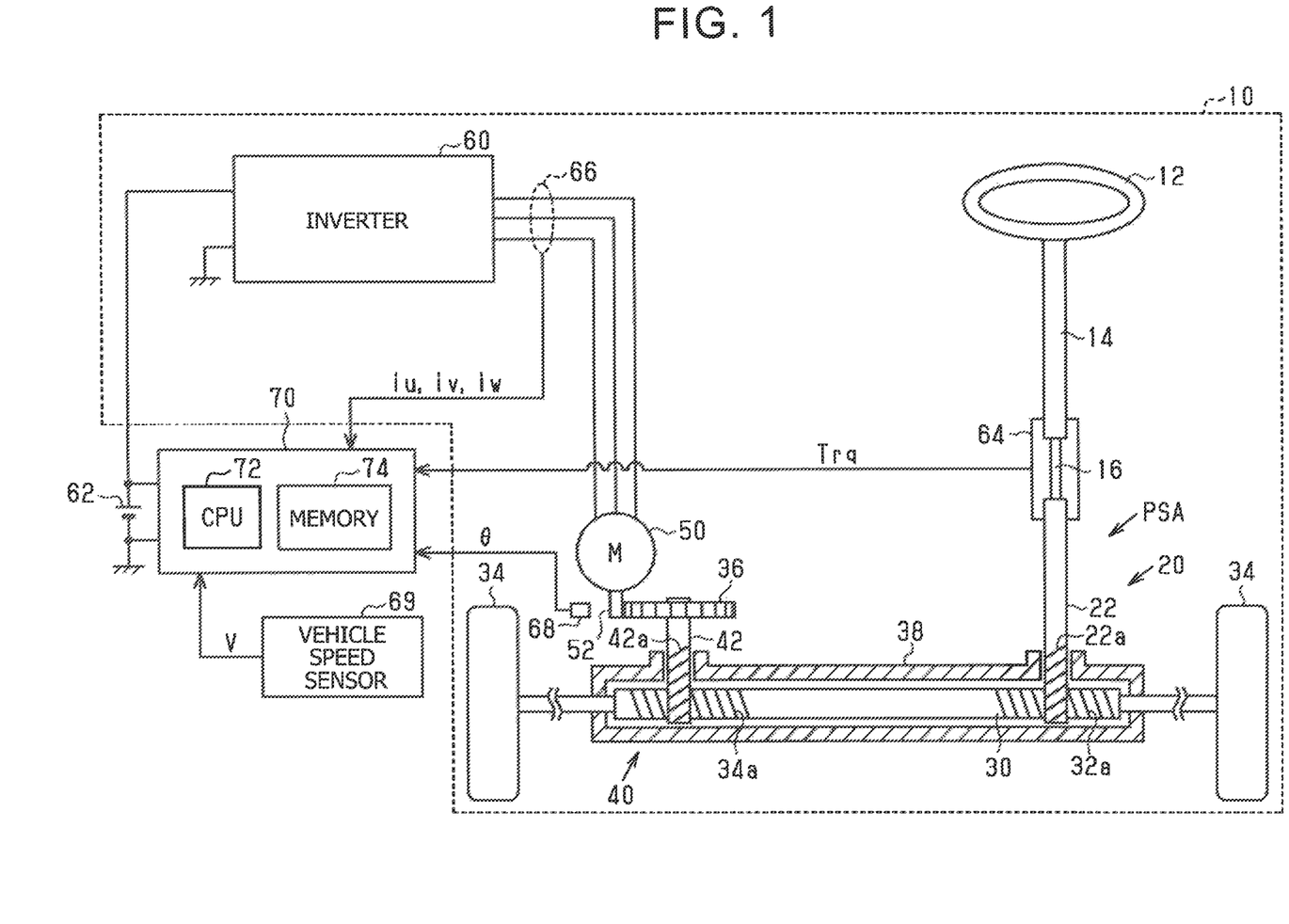
FIG. 1 is a view of a steering control device and a steering system according to an embodiment.

A steering control device according to an embodiment of the disclosure will be described with reference to the drawings. As shown in FIG. 1, in a steering system 10 according to the embodiment, a steering wheel 12 can be coupled to a pinion shaft 22 of a turning actuator PSA via a steering shaft 14. The turning actuator PSA includes a first rack and pinion mechanism 20, a second rack and pinion mechanism 40, a surface permanent magnet synchronous motor (SPM) (hereinafter, may be referred to as "motor 50"), and an inverter 60.

The first rack and pinion mechanism 20 includes a rack shaft 30 and the pinion shaft 22 that are arranged at a specified crossing angle, and first rack teeth 32a formed on the rack shaft 30 mesh with pinion teeth 22a formed on the pinion shaft 22. Note that steered wheels 34 are respectively coupled to both ends of the rack shaft 30 via tie rods.

The second rack and pinion mechanism 40 includes the rack shaft 30 and a pinion shaft 42 that are arranged at a specified crossing angle, and second rack teeth 34a formed on the rack shaft 30 mesh with pinion teeth 42a formed on the pinion shaft 42.

The pinion shaft 42 is connected to a rotational shaft 52 of the motor 50 via a speed reducer 36. The inverter 60 is connected to the motor 50. The inverter 60 is a power conversion circuit that converts a DC voltage of a battery 62 to an AC voltage by selectively applying a positive electrode voltage and a negative electrode voltage of the battery 62 to terminals of the motor 50. Note that the rack shaft 30 is accommodated in a rack housing 38.

A control device 70 controls the steering system 10, that is, the steering system 10 is a control target. When controlling the control target, the control device 70 receives a detection value of a torque sensor 64 and a detection value of a current sensor 66. The torque sensor 64 detects steering torque Trq input to the steering wheel 12 on the basis of a torsion amount of a torsion bar 16 provided between the steering shaft 14 and the pinion shaft 22, and the current sensor 66 detects currents iu, iv, iw for the motor 50. In addition, the control device 70 receives output values of a rotational angle sensor 68 and a vehicle speed sensor 69. The rotational angle sensor 68 detects a rotational angle θ of the rotational shaft 52 of the motor 50, and the vehicle speed sensor 69 detects a traveling speed (a vehicle speed V) of a vehicle. The control device 70 includes a central processing unit (CPU 72) and a memory 74, and controls the control target when the CPU 72 executes a program stored in the memory 74.

Figure 2:
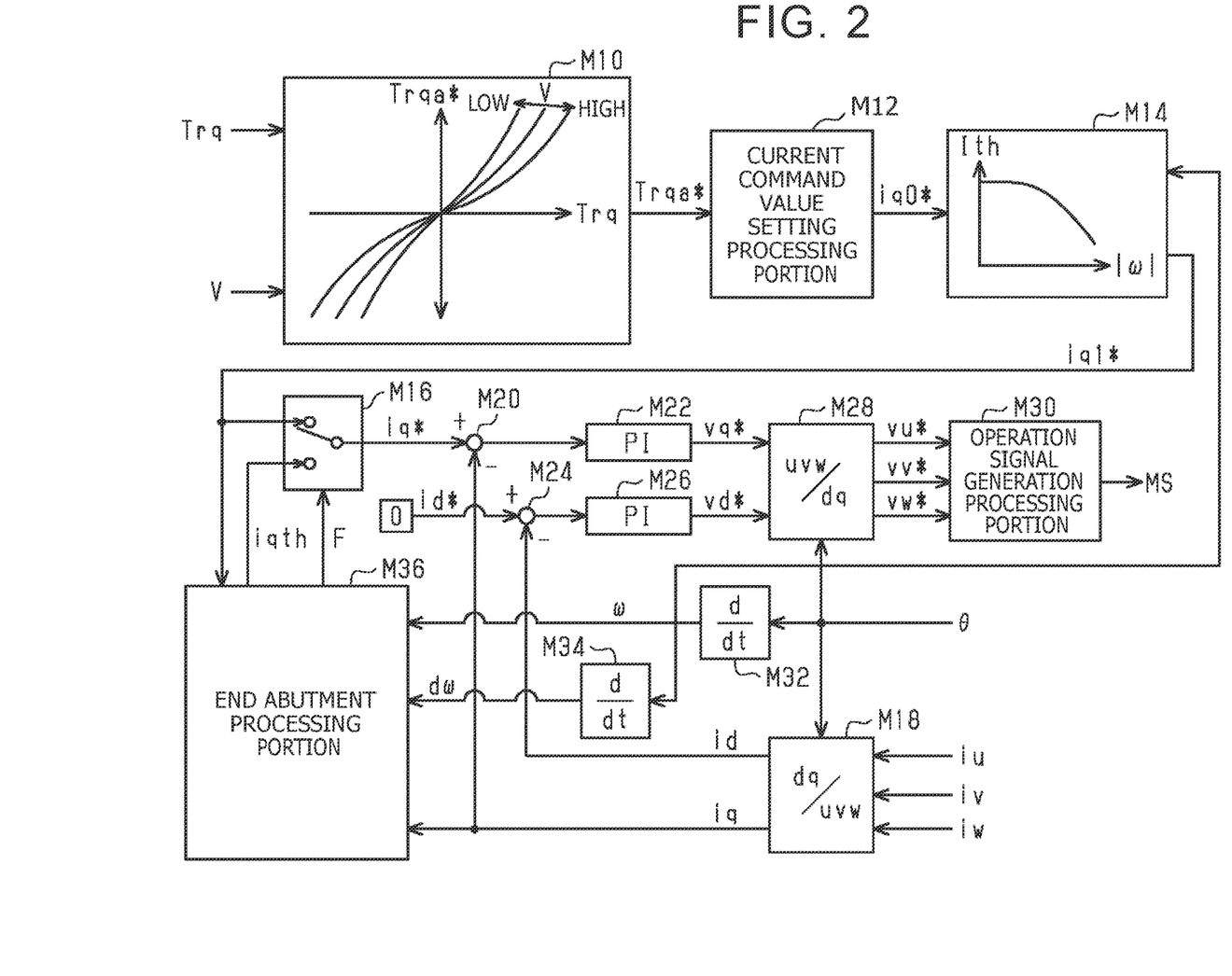
FIG. 2 is a block diagram showing a part of processing according to the embodiment.

FIG. 2 shows a part of processing that is realized when the CPU 72 executes the program stored in the memory 74. An assist torque setting processing portion M10 sets a command value of assist torque (an assist command value Trqa*) on the basis of the steering torque Trq and the vehicle speed V. The assist torque setting processing portion M10 sets a magnitude (an absolute value) of the assist command value Trqa* to a larger value as a magnitude (an absolute value) of the steering torque Trq is increased. In the case where the steering torque Trq is the same, when the vehicle speed V is low, the assist torque setting processing portion M10 sets the absolute value of the assist command value Trqa* to a larger value than that when the vehicle speed V is high. Note that, in the following description, a sign of the steering torque Trq is a positive sign when the steering torque Trq has a value on a right turn side, and a negative sign when the steering torque Trq has a value on a left turn side.

A current command value setting processing portion M12 sets a current command value iq0* of a q-axis on the basis of the assist command value Trqa*. In detail, the current command value setting processing portion M12 sets a magnitude (an absolute value) of the current command value iq0* to a larger value as the magnitude of the assist command value Trqa* is increased. Note that, as well as the sign of the steering torque Trq, a sign of the current command value iq0* is a positive sign when the current command value iq0* has a value on the right turn side.

An upper limit guard processing portion M14 performs upper limit guard processing such that the absolute value of the current command value iq0* of the q-axis becomes equal to or lower than an upper limit guard value Ith. Here, in the case where a magnitude (an absolute value) of a rotational speed ω of the motor 50 is large, the upper limit guard value Ith is set to a smaller value than that when the magnitude of the rotational speed ω is small.

A current command value iq1*, which is the current command value iq0* after being subjected to the guard processing by the upper limit guard processing portion M14, is input, as a current command value iq* of the q-axis, to a deviation computation processing portion M20 when the current command value iq1* is selected by a switching processing portion M16.

The currents iu, iv, iw are converted to a current id of a d-axis and a current iq of the q-axis by a dq conversion processing portion M18. Then, the deviation computation processing portion M20 outputs a value that is obtained by subtracting the current iq from the current command value iq*. Thereafter, on the basis of the output value from the deviation computation processing portion M20, a q-axis feedback processing portion M22 sets a voltage command value vq* of the q-axis as a manipulative variable for controlling the current iq of the q-axis to the current command value iq* through feedback. More specifically, the q-axis feedback processing portion M22 sets the manipulative variable to a sum of an output value of a proportional element and an output value of an integral element, the output value of the proportional element and the output value of the integral element being obtained by using the output value from the deviation computation processing portion M20 as an input.

A deviation computation processing portion M24 outputs a value that is obtained by subtracting the current id from a current command value (here, "0" is used as an example) of the d-axis. A d-axis feedback processing portion M26 receives the output value from the deviation computation processing portion M24 and sets a voltage command value vd* of the d-axis that is a manipulative variable for controlling the current id of the d-axis to the command value through feedback. More specifically, the d-axis feedback processing portion M26 sets the manipulative variable to a sum of an output value of a proportional element and an output value of an integral element, the output value of the proportional element and the output value of the integral element being obtained by using the output value from the deviation computation processing portion M24 as an input.

Based on the rotational angle θ, a three-phase conversion processing portion M28 converts the voltage command values vd*, vq* of the d, q-axes to voltage command values vu*, vv*, vw* in a three-phase fixed coordinate system. An operation signal generation processing portion M30 generates and outputs an operation signal MS for the inverter 60 such that an output line voltage of the inverter 60 coincides with an interphase voltage determined by the voltage command values vu*, vv*, vw*.

A rotational speed computation processing portion M32 computes the rotational speed ω of the rotational shaft 52 of the motor 50 on the basis of the rotational angle θ. An acceleration computation processing portion M34 computes a changing rate (angular acceleration dω) of the rotational speed ω on the basis of the rotational speed ω.

An end abutment processing portion M36 generates an end-time current command value iqth input to the switching processing portion M16, and provides the switching processing portion M16 with information for switching. Note that the end-time current command value iqth is a parameter set as a value for suppressing occurrence of a situation where a magnitude of the current iq becomes excessively larger than a magnitude of the current command value iq1* when a magnitude of the voltage command value vq* becomes excessively larger than an appropriate magnitude thereof for an induced voltage of the motor 50 that is abruptly decreased due to the end abutment.

Figure 3:
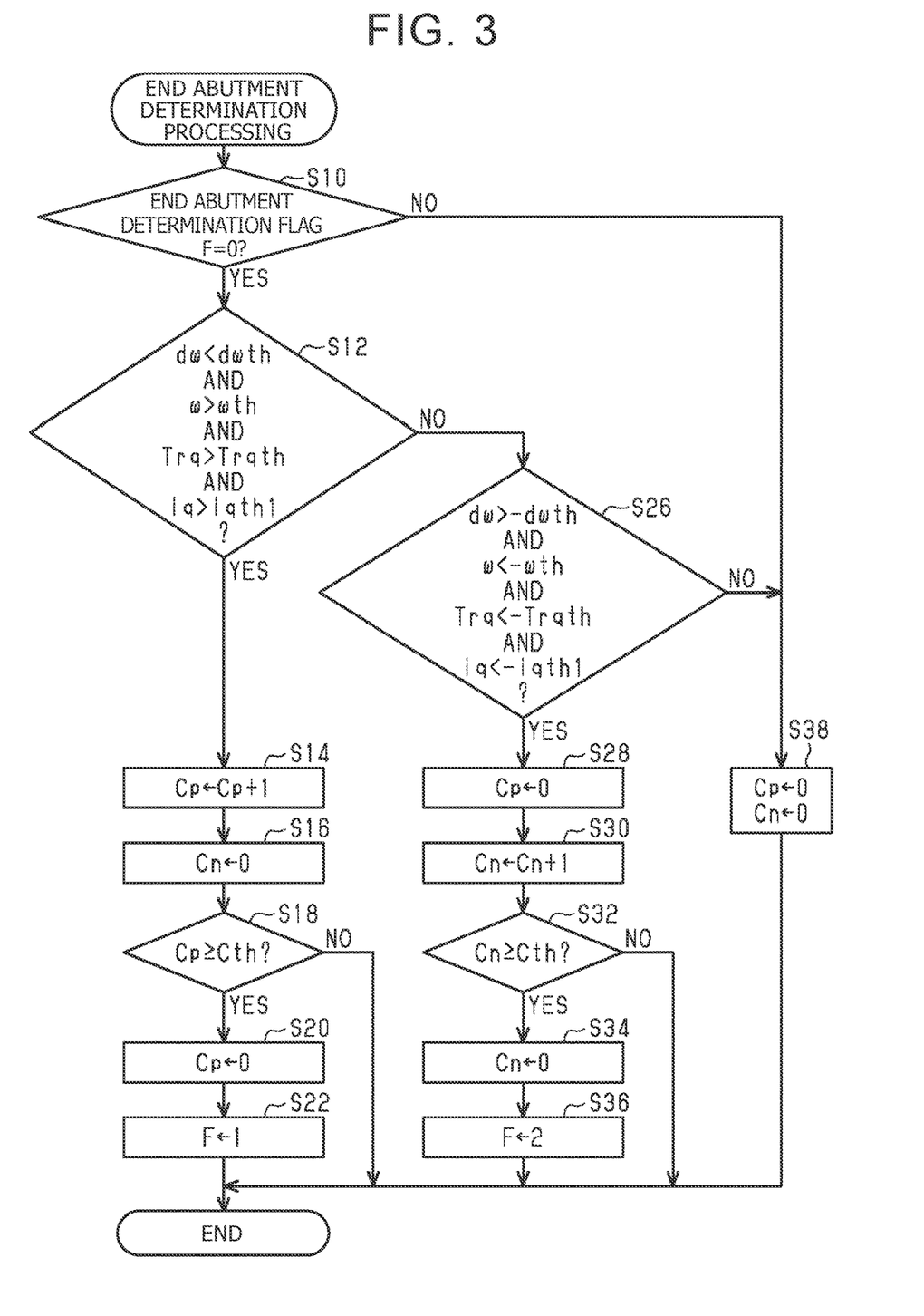
FIG. 3 is a flowchart of a procedure of end abutment determination processing according to the embodiment.

FIG. 3 shows a procedure of processing for determining whether the end abutment has occurred, as one kind of processing executed by the end abutment processing portion M36. The processing shown in FIG. 3 is realized as processing executed by the end abutment processing portion M36 when the CPU 72 executes the program stored in the memory 74. The processing shown in FIG. 3 is repeatedly executed at specified intervals, for example.

In a series of the processing shown in FIG. 3, the CPU 72 first determines whether an end abutment determination flag F is "0" (S10). When the end abutment determination flag F is "0", the end abutment determination flag F indicates that the end abutment determination has not been made (i.e., the determination that the end abutment has occurred has not been made). When the end abutment determination flag F is "1" or "2", the end abutment determination flag F indicates that the end abutment determination has been made (i.e., the determination that the end abutment has occurred has been made). When the end abutment determination flag F is "0" (S10: YES), the CPU 72 determines whether logical conjunction of the following conditions (d1), (e1), (f1), (g1) is true (S12). This processing is processing for determining whether the end abutment has occurred by turning the steering wheel 12 to the right turn side.

The condition (d1) is a condition that the angular acceleration dω is lower than a determination acceleration threshold dωth. Here, the determination acceleration threshold dωth is set to a negative value. The condition (e1) is a condition that the rotational speed ω is higher than a determination speed threshold ωth. This condition is set to control the current of the motor 50 with the use of the end-time current command value iqth only when the rack shaft 30 comes into contact with the rack housing 38 vigorously. The determination speed threshold ωth is set to a positive value.

The condition (f1) is a condition that the steering torque Trq is higher than torque threshold Trqth. This condition is set to control the current of the motor 50 with the use of the end-time current command value iqth only when the rack shaft 30 comes into contact with the rack housing 38 with a large force.

The condition (g1) is a condition that the current iq is larger than a determination current threshold iqth1. This condition is set to control the current of the motor 50 with the use of the end-time current command value iqth only when the rack shaft 30 comes into contact with the rack housing 38 with the large force.

When determining that the above logical conjunction is true (S12: YES), the CPU 72 increments a value of a right turning counter Cp that counts the number of times that the positive determination is made in step S12 (S14). Next, the CPU 72 initializes a left turning counter Cn that counts the number of times that a positive determination is made in step S26 that will be described later (S16). Then, the CPU 72 determines whether the value of the right turning counter Cp is equal to or larger than a threshold Cth (S18). Here, the threshold Cth is an integer of 2 or larger.

When determining that the value of the right turning counter Cp is equal to or larger than the threshold Cth (S18: YES), the CPU 72 initializes the right turning counter Cp (S20) and sets the end abutment determination flag F to "1" (S22). When determining that the logical conjunction of the conditions (d1), (e1), (f1), (g1) described above is false (S12: NO), the CPU 72 determines whether logical conjunction of the following conditions (d2), (e2), (f2), (g2) is true (S26). This processing is processing for determining whether the end abutment has occurred when the steering wheel 12 is turned to the left turn side.

The condition (d2) is a condition that the angular acceleration dω is higher than "$(-1) \cdot d\omega th$". The condition (e2) is a condition that the rotational speed ω is lower than "$(-1) \cdot \omega th$". The condition (f2) is a condition that the steering torque Trq is lower than "$(-1) \cdot Trqth$".

The condition (g2) is a condition that the current iq is smaller than "$(-1) \cdot iqth1$". When determining that the logical conjunction of the above conditions (d2), (e2), (f2), (g2) is true (S26: YES), the CPU 72 initializes the right turning counter Cp (S28) and increments a value of the left turning counter Cn (S30). Then, the CPU 72 determines whether the value of the left turning counter Cn is equal to or larger than the threshold Cth (S32). When determining that the value of the left turning counter Cn is equal to or larger than the threshold Cth (S32: YES), the CPU 72 initializes the left turning counter Cn (S34) and sets the end abutment determination flag F to "2" (S36).

When a negative determination is made in step S10 or S26, the CPU 72 initializes the right turning counter Cp and the left turning counter Cn (S38). When the processing in step S22, S36, or S38 is completed, or when a negative determination is made in step S18 or S32, the CPU 72 ends the series of the processing shown in FIG. 3.

Figure 4:
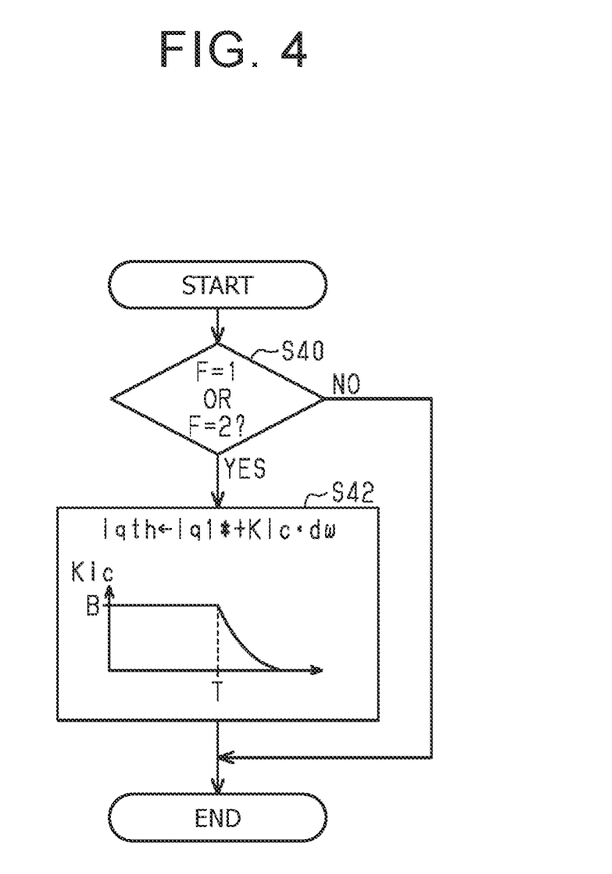
FIG. 4 is a flowchart of a procedure of processing for setting a limit current value according to the embodiment.

FIG. 4 shows a procedure of processing for setting the end-time current command value iqth according to the embodiment. The processing shown in FIG. 4 is realized as processing executed by the end abutment processing portion M36 when the CPU 72 executes the program stored in the memory 74. Note that the processing shown in FIG. 4 is repeatedly executed at specified intervals, for example.

In a series of the processing shown in FIG. 4, the CPU 72 first determines whether the end abutment determination flag F is "1" or "2" (S40). Then, when determining that the end abutment determination flag F is "1" or "2" (S40: YES), the CPU 72 performs correction on the current command value iq1* of the q-axis, which is output by the upper limit guard processing portion M14, with the use of "Kic·dω" and thus sets the end-time current command value iqth to a value obtained by performing correction to decrease an absolute value of the current command value iq1* (S42). Here, the coefficient Kic is a value that is equal to or larger than zero. In this embodiment, the coefficient Kic is set to a fixed value B until a specified time T elapses after the determination on the end abutment is made (i.e., after the CPU 72 determines that the end abutment has occurred), and the coefficient Kic is set to be gradually decreased to zero after the specified time T elapses.

Figure 5:
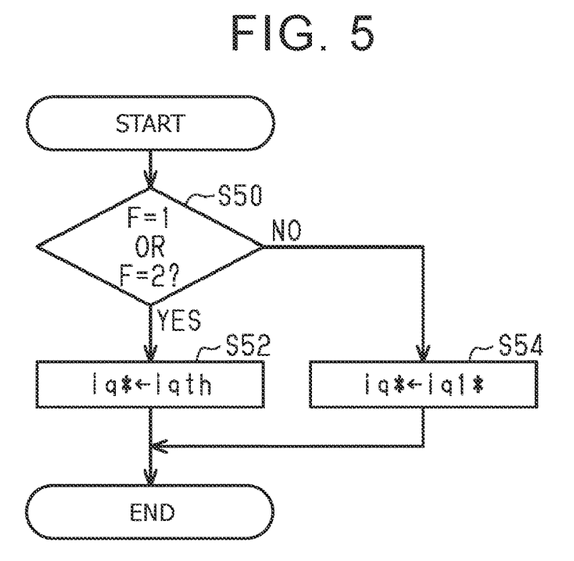
FIG. 5 is a flowchart of a procedure of processing for setting a current command value according to the embodiment.

Note that, when the processing in step S42 is completed, or when a negative determination is made in step S40, the CPU 72 ends the series of the processing shown in FIG. 4. FIG. 5 shows a procedure of processing executed by the switching processing portion M16 shown in FIG. 2. The processing shown in FIG. 5 is repeatedly executed at specified intervals, for example. In the following description, the CPU 72 executes the processing.

In a series of the processing shown in FIG. 5, the CPU 72 first determines whether the end abutment determination flag F is "1" or "2" (S50). This processing is executed to determine whether the end-time current command value iqth is to be used as the current command value iq*. Then, when determining that the end abutment determination flag F is "1" or "2" (S50: YES), the CPU 72 selects the end-time current command value iqth as the current command value iq* of the q-axis (S52). When determining that the end abutment determination flag F is "0" (S50: NO), the CPU 72 selects the current command value iq1*, which is output by the upper limit guard processing portion M14 shown in FIG. 2, as the current command value iq* of the q-axis (S54).

Figure 6:
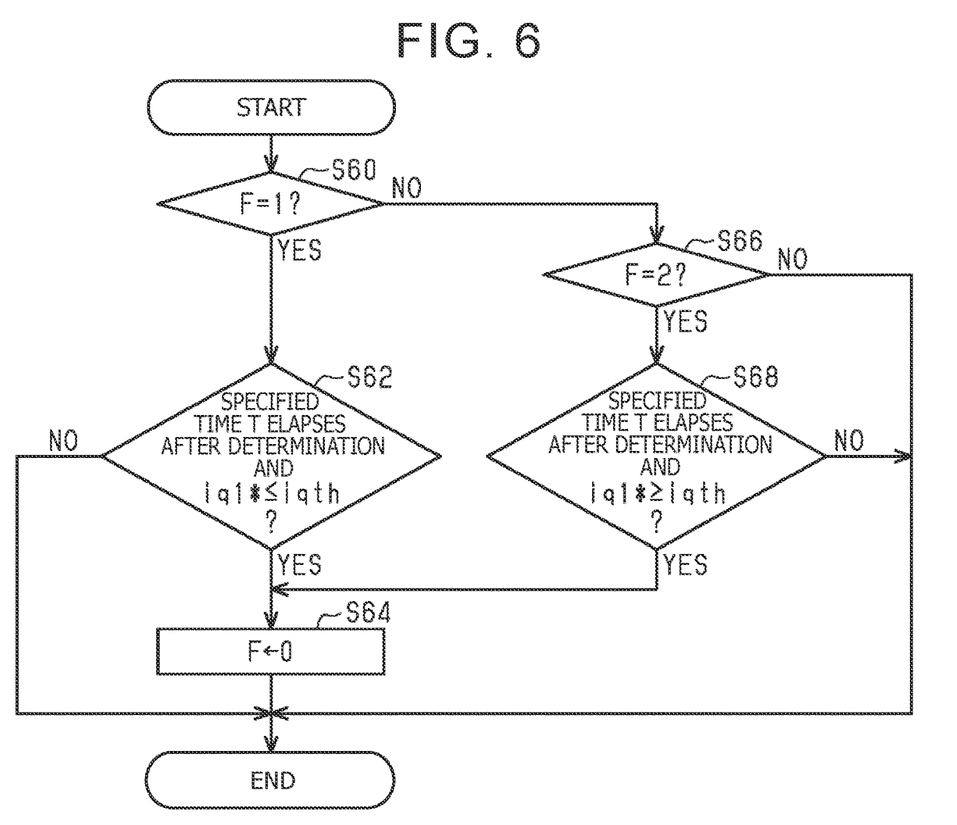
FIG. 6 is a flowchart of a procedure of processing for resetting an end abutment determination flag according to the embodiment.

Note that when the processing in step S52 or S54 is completed, the CPU 72 ends the series of the processing shown in FIG. 5. Next, a description will be provided on initialization processing for the end abutment determination flag F FIG. 6 shows a procedure of processing for initializing the end abutment determination flag. The processing shown in FIG. 6 is realized as processing executed by the end abutment processing portion M36 when the CPU 72 executes the program stored in the memory 74. Note that the processing shown in FIG. 6 is repeatedly executed at specified intervals, for example.

In a series of the processing shown in FIG. 6, the CPU 72 determines whether the end abutment determination flag F is "1" (S60). When determining that the end abutment determination flag F is "1" (S60: YES), the CPU 72 determines whether logical conjunction of a condition that the specified time T elapses after the determination on the end abutment (i.e., after the CPU 72 determines that the end abutment has occurred) and a condition that the current command value iq1* output by the upper limit guard processing portion M14 is equal to or smaller than the end-time current command value iqth is true (S62). The condition that the current command value iq1* is equal to or smaller than the end-time current command value iqth is a condition that the magnitude of the current command value iq1* is equal to or smaller than the magnitude of the end-time current command value iqth. Then, when determining that the logical conjunction is true (S62: YES), the CPU 72 sets the end abutment determination flag F to "0" (S64).

When determining that the end abutment determination flag F is not "1" (S60: NO), the CPU 72 determines whether the end abutment determination flag F is "2" (S66). Then, when determining that the end abutment determination flag F is "2" (S66: YES), the CPU 72 determines whether logical conjunction of the condition that the specified time T elapses after the determination on the end abutment (i.e., after the CPU 72 determines that the end abutment has occurred) and a condition that the current command value iq1* output by the upper limit guard processing portion M14 is equal to or larger than the end-time current command value iqth is true (S68). The condition that the current command value iq1* output by the upper limit guard processing portion M14 is equal to or larger than the end-time current command value iqth is a condition that the magnitude of the current command value iq1* is equal to or smaller than the magnitude of the end-time current command value iqth. Then, when determining that the logical conjunction is true (S68: YES), the CPU 72 sets the end abutment determination flag F to "0" (S64).

Note that, when the processing in step S64 is completed or when a negative determination is made in step S62, S66, or S68, the CPU 72 ends the series of the processing shown in FIG. 6. Here, effects of this embodiment will be described.

In the case where the rack shaft 30 comes into contact with the rack housing 38 and thus the axial displacement of the rack shaft 30 is restricted, that is, the end abutment occurs when the steering wheel 12 is turned to the right turn side or the left turn side, a magnitude of the induced voltage of the motor 50 is abruptly decreased. Accordingly, the magnitude of the current iq is increased. When determining that the end abutment has occurred, the CPU 72 performs correction on the absolute value of the current command value iq1* with the use of "Kic·dω" such that the absolute value of the current command value iq1* is decreased, that is, the CPU 72 decreases the absolute value of the current command value iq1* with the use of "Kic·dω". In this period, the rotational speed ω is decreased by the end abutment. Accordingly, the magnitude of the voltage command value vq* of the q-axis, which is output by the q-axis feedback processing portion M22 shown in FIG. 2, tends to have a larger value than an appropriate value for controlling the current iq to the current command value iq1*. The q-axis feedback processing portion M22 decreases the magnitude of the voltage command value vq* of the q-axis in accordance with the degree by which the magnitude of the current iq exceeds a magnitude of the current command value iq*. Here, in this embodiment, a magnitude of the end-time current command value iqth is set to be a smaller value than the magnitude of the current command value iq1*, which is output by the upper limit guard processing portion M14. Accordingly, as compared to the case where the current command value iq* is set to the current command value iq1*, the magnitude of the voltage command value vq* of the q-axis can be promptly decreased.

In particular, a degree, by which the magnitude of the current command value iq1* is corrected to be decreased to obtain the end-time current command value iqth, is increased as an absolute value of the angular acceleration dω is increased. Thus, the magnitude of the end-time current command value iqth can be decreased as a decrease rate of the magnitude of the induced voltage is increased. Accordingly, a decrease rate of the magnitude of the voltage command value vq* of the q-axis can be increased as the decrease rate of the magnitude of the induced voltage is increased.

In the following description, "the CPU 72 that executes specified processing in accordance with the program stored in the memory 74" will be described as "the CPU 72 that executes the specified processing" for simplifying the description.

The end determination processing portion may be regarded as the CPU 72 that executes the processing in steps S12 to S22, S26 to S36. The end-time limit processing portion may be regarded as the CPU 72 that executes the processing in steps S42, S52. In addition, a feedback processing portion may be regarded as the q-axis feedback processing portion M22 and the deviation computation processing portion M20, a steering control device may be regarded as the control device 70, and a command value setting processing portion may be regarded as the assist torque setting processing portion M10, the current command value setting processing portion M12, and the upper limit guard processing portion M14.

Note that the above embodiment may be changed as follows. The end determination processing portion is not limited to the end determination processing portion that determines that the end abutment has occurred on the basis of a fact that the logical conjunction of the above conditions (d1) to (g1) is true or a fact that the logical conjunction of the above conditions (d2) to (g2) is true. For example, the end determination processing portion may determine that the end abutment has occurred on the basis of a fact that logical conjunction of the above conditions (d1) to (f1) is true or a fact that logical conjunction of the above conditions (d2) to (f2) is true. For example, the end determination processing portion may determine that the end abutment has occurred on the basis of a fact that logical conjunction of the above conditions (d1), (e1), and (g1) is true or a fact that logical conjunction of the above conditions (d2), (e2), and (g2) is true. For example, the end determination processing portion may determine that the end abutment has occurred on the basis of a fact that logical conjunction of the above conditions (d1) and (e1) is true or a fact that logical conjunction of the above conditions (d2) and (e2) is true.

In the above embodiment, the threshold Cth is set to 2 or larger. However, the threshold Cth may be 1. The determination on the end abutment is not limited to the determination based on the decrease in the absolute value of the rotational speed ω. For example, it may be determined that the end abutment has occurred on the basis of the steering torque Trq and a changing rate thereof. More specifically, it may be determined that the end abutment has occurred on the condition that the magnitude of the steering torque is equal to or larger than a specified value and a magnitude of the changing rate of the steering torque is equal to or larger than a prescribed value.

The feedback processing portion is not limited to the feedback processing portion that sets the voltage command value vq* to the sum of the output values of the proportional element and the integral element, the output values of the proportional element and the integral element being obtained by using, as an input, a difference between the current iq and the current command value iq* of the q-axis. For example, the feedback processing portion may set the voltage command value vq* to the output value of the integral element. The feedback processing portion may set the voltage command value vq* by taking the output value of a derivative element into consideration. In this case, with the use of the derivative element, it is possible to suppress an abrupt increase in the magnitude of the current iq, which is caused by an abrupt decrease in the magnitude of the induced voltage.

The feedback processing portion is not limited to the feedback processing portion that sets the voltage command value vq* to the sum of the output values of the proportional element and the integral element, the output values of the proportional element and the integral element being obtained by using, as an input, a difference between the current iq and the current command value iq* of the q-axis. For example, the feedback processing portion may set the voltage command value vd* to the output value of the integral element. The feedback processing portion may set the voltage command value vd* by taking the output value of the derivative element into consideration.

The current control is not limited to the control that sets the voltage command value vd* of the d-axis as a feedback manipulative variable of the d-axis. For example, the voltage command value vd* of the d-axis may be set as a sum of the feedback manipulative variable of the d-axis and an open-loop manipulative variable "$(-1)\cdot\omega\cdot L\cdot iq$" in decoupling control. Here, an inductance L is used.

The current control is not limited to the control that sets the voltage command value vq* of the q-axis as a feedback manipulative variable of the q-axis. For example, the voltage command value vq* of the q-axis may be set as a sum of the feedback manipulative variable of the q-axis and an open-loop manipulative variable "$\omega\cdot L\cdot id$" in the decoupling control. Furthermore, the voltage command value vq* of the q-axis may be set as a sum of the feedback manipulative variable of the q-axis, the open-loop manipulative variable in the decoupling control, and an open-loop manipulative variable "$\omega\cdot\phi$" corresponding to the induced voltage. In the case where the open-loop manipulative variable corresponding to the induced voltage is used and changing of the open-loop manipulative variable is delayed due to a set updating interval of the open-loop manipulative variable or a set updating interval of the rotational speed ω as an input for the updating of the open-loop manipulative variable when the magnitude of the induced voltage is abruptly decreased by the end abutment, the magnitude of the current iq may be abruptly increased. In such a case, it is effective to set the current command value iq* during the end abutment to "$iq1^* + Kic\cdot d\omega$".

In the above embodiment, the current command value id* of the d-axis is set to zero. However, the disclosure is not limited to this configuration. For example, the current command value id* may be set to a negative value, and weak field control may be executed. Control of current components in a rotating coordinate system to command values thereof is not limited to control of the current components on the d, q-axes. For example, current components in a rotating coordinate system, which are deviated from the d, q-axes by a specified angle, may be controlled to command values thereof. However, in this case, command values of the two current components in the rotating coordinate system may be corrected to be decreased in accordance with the angular acceleration dω.

In the processing in FIG. 4, after Kic in "Kic·dω" is set to a constant value that is larger than zero for the specified time T, the Kic is gradually decreased to zero. In addition, the specified time T is set to coincide with the specified time T in steps S62, S68 in FIG. 6. However, the disclosure is not limited to this control. In other words, the specified time T in the processing in FIG. 4 may not coincide with the specified time T in steps S62, S68 in FIG. 6.

In the above embodiment and the modified example thereof, the end-time limit processing portion performs correction to increase a magnitude of the difference between the current command value iq* and the current iq, by performing correction to decrease the current command value iq1* of the q-axis, the difference between the current command value iq* and the current iq being input to the q-axis feedback processing portion M22. However, the disclosure is not limited to this control. The end-time limit processing portion may perform correction to increase the current iq in accordance with a degree of a decrease in the magnitude of the rotational speed ω. More specifically, for example, the end-time limit processing portion may perform correction to change the current iq, which is input to the deviation computation processing portion M20, to "$iq\cdot Kic\cdot d\omega$".

In addition, the current command value iq*, which is input to the deviation computation processing portion M20 during the end abutment, is not limited to the current command value iq* based on the latest current command value iq1*. For example, as described in JP 2009-143312 A described above, the current command value iq1* may be set to a value that is processed by a low pass filter at a time when the determination on the end abutment is made (i.e., when it is determined that the end abutment has occurred).

An interior permanent magnet synchronous motor (IPMSM) may be used. In the case where the IPMSM is used, an absolute value of the current command value id* of the d-axis may be corrected to be decreased in accordance with the degree of the decrease in the magnitude of the rotational speed ω. In this way, reluctance torque can be decreased. Thus, it is possible to further suppress occurrence of a phenomenon in which the torque of the motor 50 is increased due to the end abutment.

The limit angle as the upper limit value of the absolute value of the turning angle of the steered wheels 34 is not limited to the turning angle at the time when the rack shaft 30 comes into contact with the rack housing 38, the limit angle being determined by a structure of the steering system 10. For example, in the case where a spiral cable is attached to the steering wheel 12 and the rack shaft 30 does not come into contact with the rack housing 38 at a time when the absolute value of the steering angle of the steering wheel 12 becomes the upper limit value determined by the spiral cable, the limit angle may be the maximum value of the turning angle that is determined by the spiral cable. However, as will be described later, when the steering system includes the actuator that varies a steering angle ratio, the limit angle is a value that is changed in accordance with the steering angle ratio.

A permanent magnet synchronous motor is not limited to the SPM and may be the IPMSM, for example, as described above. In addition, the motor is not limited to the permanent magnet synchronous motor. For example, the motor may be a DC motor. The motor may be a wound-field synchronous motor that does not include a permanent magnet. In the case where a rotor does not include the permanent magnet, when the magnitude of the rotational speed is abruptly decreased, the magnitude of the current flowing through a stator coil may be abruptly increased due to the abrupt decrease in the magnitude of the induced voltage. Thus, it is effective to set the current command value iq* during the end abutment to "$iq1^* + Kic\cdot d\omega$".

The control device 70 is not limited to the control device that includes the CPU 72 and the memory 74, and executes all of the above-described various kinds of processing as software processing. For example, the control device 70 may include dedicated hardware (an application specific integrated circuit: ASIC) that executes at least a part of the processing shown in FIG. 3.

The steering system is not limited to the steering system in which the rotational angle (the steering angle) of the steering wheel 12 corresponds to the turning angle of the steered wheels 34 on one-to-one basis. For example, the steering system may include a steering angle ratio variable actuator, and may be configured such that the steering angle ratio can be changed by electronic control, the steering angle ratio being a ratio between the steering angle and the turning angle.

The turning actuator PSA is not limited to the turning actuator of a rack and pinion type. For example, a turning actuator of a rack cross type, a rack parallel (registered trademark) type, a rack coaxial type, or the like may be employed.

What is claimed is:

1. A steering control device configured to control a steering system including a turning actuator that turns steered wheels of a vehicle, the steering system assisting turning of the steered wheels in accordance with steering of a steering wheel, the turning actuator including a motor, the steering control device comprising a processor programmed to function as:
   a command value setting processing portion configured to set a current command value based on a detection value of steering torque;
   a feedback processing portion configured to control a voltage applied to the motor so as to control through feedback a current flowing through the motor to the current command value, based on an output value of an integral element obtained by using, as an input, a difference between the current flowing through the motor and the current command value;
   an end determination processing portion configured to determine whether a turning angle of the steered wheels has reached a limit angle determined by a structure of the steering system; and
   an end-time limit processing portion configured to perform correction to decrease an absolute value of the current command value such that a magnitude of the current command value is limited to an end-time current command value so as to perform correction to increase a magnitude of the difference between the current flowing through the motor and the current command value, by calculating an end-time current command value that is obtained by adding, to the current command value, a value obtained by multiplying a changing rate of a magnitude of a rotational speed of the motor by a coefficient, and setting the calculated end-time current command value as the current command value, when the end determination processing portion determines that the turning angle has reached the limit angle.

2. The steering control device according to claim 1, wherein the end-time limit processing portion is configured to i) limit the magnitude of the current command value for the motor that is input to the feedback processing portion, to the calculated end-time current command value, ii) maintain the coefficient at a specified value larger than zero for a specified time, and iii) gradually decrease the coefficient after the specified time elapses.

3. The steering control device according to claim 1, wherein
   the end-time limit processing portion is configured to set a period of time in which the coefficient is maintained at a specified value larger than zero, and a period of time in which the coefficient is decreased after the period of time in which the coefficient is maintained at the specified value elapses.

* * * * *